United States Patent [19]

Nakagawa et al.

[11] Patent Number: 5,485,206
[45] Date of Patent: Jan. 16, 1996

[54] METHOD OF DRIVING IMAGE SENSOR AND IMAGE SENSOR

[75] Inventors: Eigo Nakagawa; Norikazu Yamada; Chikaho Ikeda, all of Ebina, Japan

[73] Assignee: Fuji Xerox Co., Ltd., Tokyo, Japan

[21] Appl. No.: 88,643

[22] Filed: Jul. 9, 1993

[30] Foreign Application Priority Data

Jul. 10, 1992 [JP] Japan ................... 4-206143

[51] Int. Cl.$^6$ .................................. H04N 5/335
[52] U.S. Cl. .................... 348/301; 348/300; 348/294; 348/308
[58] Field of Search ................... 348/294, 300, 348/301, 308, 318, 319; 250/208.1; H04N 5/335

[56] References Cited

U.S. PATENT DOCUMENTS

| | | | |
|---|---|---|---|
| 4,336,557 | 6/1982 | Koch | 358/213 |
| 4,382,187 | 3/1983 | Fralen et al. | 250/378 |
| 4,809,075 | 2/1989 | Akimoto et al. | 358/213.18 |
| 4,974,093 | 11/1990 | Murayama et al. | 358/213.19 |
| 5,268,567 | 12/1993 | Bowlby, Jr. et al. | 250/208.1 |
| 5,268,764 | 12/1993 | Kihara et al. | 358/213.16 |

*Primary Examiner*—Michael T. Razavi
*Assistant Examiner*—Bipin Shalwala
*Attorney, Agent, or Firm*—Finnegan, Henderson, Farabow, Garrett & Dunner

[57] ABSTRACT

A signal is read from photodiodes periodically with a predetermined period and applied to the input terminal. The input signal is amplified by an amplifier circuit and switched by a signal switching circuit to be alternately input to two offset cancel circuits through their respective switching elements. The period with which the switching elements are periodically turned on is set to be virtually double the period in the outputting of the signal from the photodiodes. The periods of time at which the switching elements are alternately turned on are shifted virtually half the period from each other. Further, output signals from the offset cancel circuits are adapted to be alternately output through a multiplexer.

5 Claims, 5 Drawing Sheets

METHOD OF DRIVING IMAGE SENSOR AND IMAGE SENSOR

BACKGROUND OF THE INVENTION

1. Field of the Invention

The present invention relates to an image sensor used for an image reading portion of a facsimile system, an image scanner, and the like and, more particularly, to an image sensor improved in the driving frequency thereof.

2. Description of the Related Art

An example of the image sensors used for such apparatus as the facsimile systems and image scanners, is a commonly known type which senses reflected light from an original with photodiodes and photoelectrically converts the sensed light to thereby obtain an electric signal corresponding to the image of the original.

In such an image sensor, it sometimes occurs that the output signal therefrom includes so-called offset noise. Since the offset noise causes uneven image density or bad image quality, it is desired that the offset noise is kept as small as possible. Therefore, there have been proposed various techniques to suppress the offset noise. For example in Japanese Laid-open Patent Publication No. 63-28167, there is disclosed an art, in which the noise signal as the cause of the so-called offset noise is picked up separately from the image signal and the picked up noise signal is subtracted from the image signal including the noise and, thereby, an image signal free from the offset noise is obtained.

In the above described image sensor, an amplifier is used for elevating the image signal gone through the subtracting treatment to a desired level. However, since such an amplifier has an optimum operating frequency, one cannot simply increase the image sensor driving frequency according to an increase in the speed of the apparatus using the image sensor and, hence, there have been problems as described below.

A simplified example of the above described conventional amplifier circuit is shown in FIG. 4. With reference to this figure, the problem arising when the driving frequency of the image sensor is increased will be described below.

The circuit shown in FIG. 4 is such that it amplifies an image signal from a photodiode, not shown. The portion in the diagram encircled by a broken line is provided for each bit, i.e., the same is connected to one photodiode so that a signal from the photodiode is input thereto. Since the circuits for each of the bits are the same, the circuit depicted for the first bit will be briefly described below. This circuit has a front-stage amplifier portion 51 formed with an operational amplifier 50 in the center and a back-stage amplifier portion 53 formed with an operational amplifier 52 in the center.

The front-stage amplifier portion 51 constitutes a non-inverting amplifier circuit whose amplification factor is determined by a resistor 54 and a resistor 55. The resistor 55 is provided with a capacitor 56 connected in parallel therewith for cutting off high-frequency noise.

The back-stage amplifier 53 having the operational amplifier 52 constitutes a voltage follower with an amplification factor of 1. Therefore, the total amplification factor of the amplifier circuit for one bit is virtually determined by the amplification characteristic of the front-stage amplifier 51. As is well known, the transient response characteristic of the front-stage amplifier 51 is virtually determined by the time constant as the product of the resistance of the resistor 55 and the capacitance of the capacitor 56. For example, when this circuit is driven by a driving frequency f1 (for example around 1 MHz), if a signal with a rectangular waveform as depicted by the chain line in FIG. 5(a) is applied to the input terminal, a signal waveform as depicted by the solid line in FIG. 5(a) is obtained at the output point A of the front-stage amplifier 51. In such a case, if it is assumed that the output voltage is sampled and input to the back-stage amplifier 53 at the point of time ts when a sufficient time has passed after the inputting of the signal, a voltage difference ($\Delta V = V1 - V2$), where V2 is the voltage value at the output point A at the point of time ts and V1 is an ideal voltage value at the same point of time (i.e., the value of the output signal which would be output from the front-stage amplifier 51 when it is assumed to be a so-called ideal amplifier), will become so small as to be practically negligible provided that the driving frequency is within the optimum operating frequency of the front-stage amplifier 51. This is because V2 is the value of the signal when the change in the signal has been sufficiently reduced.

However, when the circuit is driven at a still higher frequency (at a frequency beyond the optimum operating frequency range of the circuit), then, since the transient response characteristic of the circuit itself is the same, it follows that the sampling is performed at a point of time where the output signal has not yet sufficiently risen (refer to FIG. 5(b)). Therefore, the difference $\Delta Va$ between the voltage value $V2a$ at the output point A at the sampling point of time ts1 and the ideal voltage value V1, $\Delta Va = V1 - V2a$), is no longer negligible.

Therefore, it is considered that the transient response characteristic of the circuit is improved by decreasing the time constant through adjustment of the capacitance of the capacitor 56 in the circuit shown in FIG. 4. Then, the transient response characteristic is improved and the voltage value $V2c$ at the output point A at the point of time ts becomes sufficiently great as shown in FIG. 5(c) and, hence, the sampling error $\Delta Vc$ becomes sufficiently small.

However, the decrease in the capacitance of the capacitor 56 decreases the time constant determined by the capacitance of the capacitor 56 and the resistance of the resistor 55, and thereby, as well known, shifting of the cutoff frequency of the front-stage amplifier 51 to the high-frequency side is brought about (refer to FIG. 6). If the cutoff frequency is shifted to the high-frequency side, such results are brought about that the high-frequency noise is increased and the S/N ratio of the image signal is deteriorated. Thus, there has been a problem that the desire for an improved driving frequency of the image sensor and the desire for an improved S/N ratio of the output signal are mutually contradictory.

SUMMARY OF THE INVENTION

The present invention was made in view of the above mentioned problem. Accordingly, it is an object of the present invention to provide a method for driving an image sensor, and an the image sensor which makes high-speed driving possible and yet provides a good S/N ratio.

In order to solve the above mentioned problems, a method for driving an image sensor according to the invention set forth comprises the steps of alternately and repeatedly performing a first sampling process, in which optical charges that are read from photodiodes periodically with a predetermined period are sampled periodically with virtually double the period in the reading of optical charges, and a second sampling process, in which the optical charges are sampled, after the first sampling process is finished, periodically with virtually double the period in the reading of optical charges, and repeatedly performing, while executing the first sampling process, outputting of the signal sampled in the second sampling process executed immediately before the first sampling process was started, and, after execution of the first sampling process, performing, while executing the second sampling process, outputting of the signal sampled in the first sampling process executed immediately before the second sampling process was started.

An image sensor of the invention set forth comprises amplification means for amplifying optical charges input from photodiodes periodically with a predetermined period, two offset cancel means for canceling an offset signal included in the output signal of the amplification means, signal switching means connected between the amplification means and the two offset cancel means, and selective output means for selectively outputting the output signals of the two offset cancel means, wherein the signal switching means has a first sampling portion, which inputs the output signal of the amplification means to one offset cancel means of the two offset cancel means periodically with virtually double the period in the reading of optical charges, and a second sampling portion, which inputs the output signal of the amplification means to the other offset cancel means of the two offset cancel means periodically with virtually double the period in the reading of optical charges, the first sampling portion and the second sampling portion alternately performing the sampling operations at periods of time shifted half the period from each other, and wherein the selective output means, while the first sampling portion is performing its sampling operation, selectively outputs the output signal of the second sampling portion and, while the second sampling portion is performing its sampling operation, selectively outputs the output signal of the first sampling portion.

In the above described image sensor, the amplification means preferably includes amplification factor adjustment means for changing the amplification factor of the amplification means.

Further, the amplification factor adjustment means, during the period of time when the signal from the photodiodes is input to the amplification means, preferably makes the amplification factor of the amplification means greater than that in the period of time preceding or subsequent to the signal inputting.

Furthermore, the amplification adjustment means preferably connects a resistor parallel to a feedback resistor of an amplifier circuit constituting the amplification means periodically with a predetermined period.

In the method of driving an image sensor according to the invention set forth, two processes for sampling a signal read from photodiodes periodically with a predetermined period are alternately and repeatedly performed periodically with virtually double the period in the reading of the signal, i.e., virtually in every other period and, in addition, at periods of time shifted virtually half the period, and, further, such that, while one sampling process is being executed, the signal sampled in the other sampling process executed immediately before the current sampling process was started is output. Thus, the repetition period of each sampling process can be made slower than the period in the reading of the signal from the photodiodes (driving speed). Accordingly, an increase in the driving speed of the photodiodes can be satisfactorily supported and the deterioration in the S/N ratio following the high speed operation can be lessened.

In the image sensor according to another aspect of the invention set forth, a signal input from the photodiodes to the amplification means periodically with a predetermined period is amplified by and output from the amplification means to be input to the signal switching means. The first sampling portion and the second sampling portion of the signal switching means operate periodically with a period double the period in the signal inputting from the photodiodes to the amplification means and, in addition, at operating periods of time half the period shifted from each other. Thereby, the image signal input to the signal switching means is alternately input to one offset cancel means connected with the first sampling portion and to the other offset cancel means connected with the second sampling portion. By the selective output means, the signal sampled in the second sampling portion is selectively output while the first sampling portion is performing its sampling operation and the signal sampled in the first sampling portion is output while the second sampling portion is performing its sampling operation. Therefore, the circuit operating speed in the stage subsequent to the amplification means can be reduced to half the input speed of the signal from the photodiodes to the amplification means and, therefore, the deterioration in the S/N ratio following an increase in operating speed can be lessened accordingly.

In the image sensor according to another aspect of the invention set forth, there is provided amplification factor adjustment means for changing the amplification factor of the amplification means of the image sensor set forth. Hence, the amplification means is enabled to change the amplification factor by the amplification adjustment means and suitable amplification according to the need can thereby be achieved. Especially because the amplification factor is arranged to be increased only during a predetermined period of time as set forth, it is made possible to increase the amplification factor only when it is necessary and not to greatly amplify an unwanted input signal and, thereby, a great dynamic range can be secured.

DESCRIPTION OF THE PREFERRED EMBODIMENTS

Figure 1:
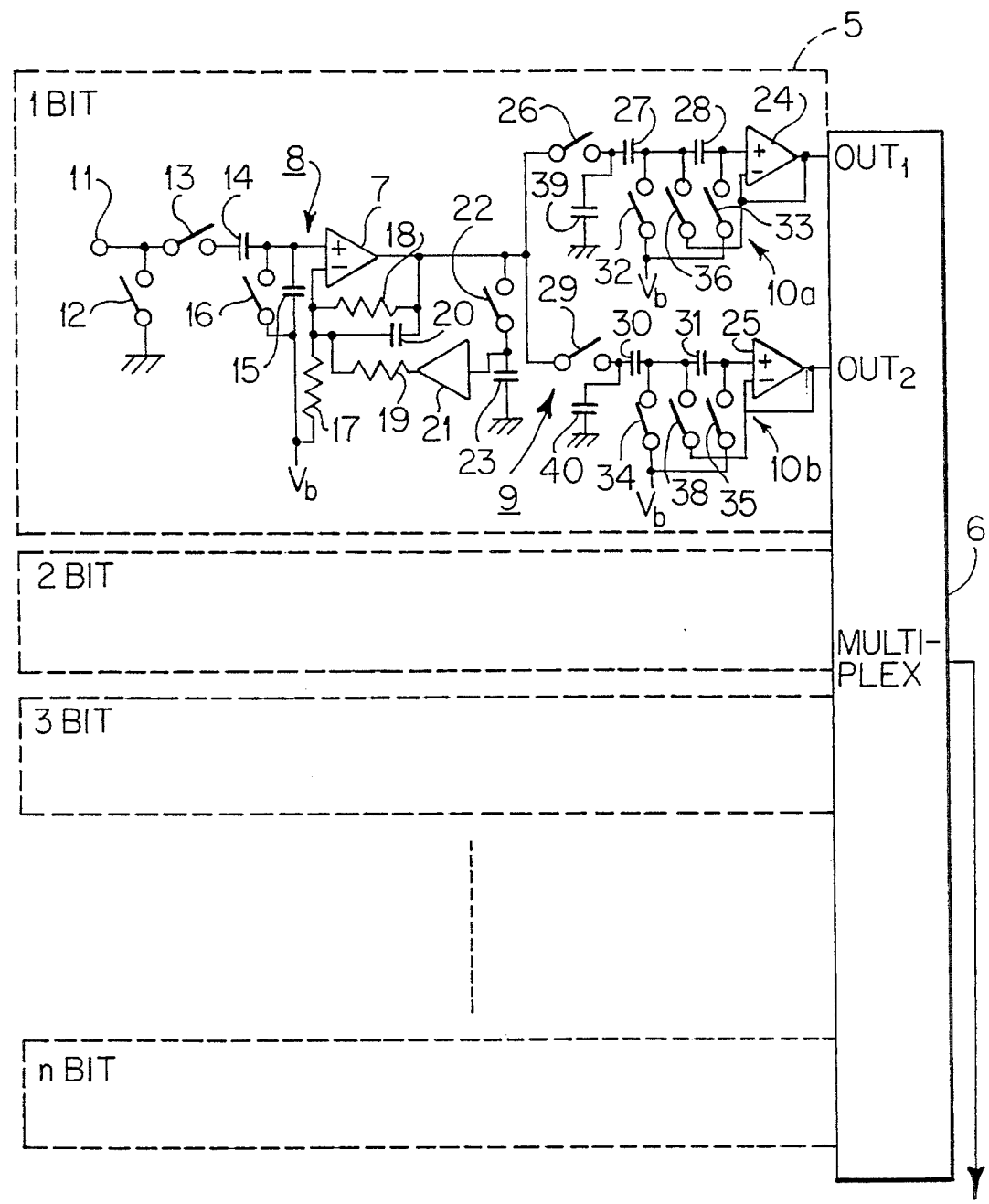
FIG. 1 is a circuit diagram showing an embodiment of the main portion of an image sensor according to the present invention.

An image sensor and a method for driving the sensor according to the present invention will be described below with reference to FIG. 1 to FIG. 3. FIG. 1 is a circuit diagram showing an embodiment of the driving circuit of the image sensor according to the present invention, FIG. 2 is a structural diagram showing a general arrangement of an image sensor according to the present invention, and FIG. 3 is a timing chart of main portions explanatory of operations of the driving circuit shown in FIG. 1.

The image sensor can be broadly divided into a sensor portion 1 and a signal processor portion 2. The sensor portion 1 has a commonly known structure with for example a plurality of photodiodes 3 arranged linearly (or it may be arranged in a so-called two-dimensional array). Specifically, the sensor portion 1 is adapted such that the plurality of photodiodes 3 are connected with each other on their cathode sides to be supplied with a bias voltage VB. On the other hand, the anodes of the photodiodes 3 are separately connected with the input stage of the signal processor portion 2. There is formed wiring parasitic capacitance between the wiring connecting each anode of the plurality of photodiodes 3 to the signal processor portion 2 and ground, which capacitance is indicated in FIG. 2 by an electric symbol of a capacitor with a reference character CL attached to the side thereof.

Further, between the anode of the plurality of the photodiodes 3 and ground, there is connected a switching element 4 formed of a MOS transistor or the like, which performs a function to discharge the charges accumulated on the wiring parasitic capacitance CL after reading of the optical charges from the photodiode 3 is finished, to make it ready for the reading of the optical charges at the next timing.

Figure 2:
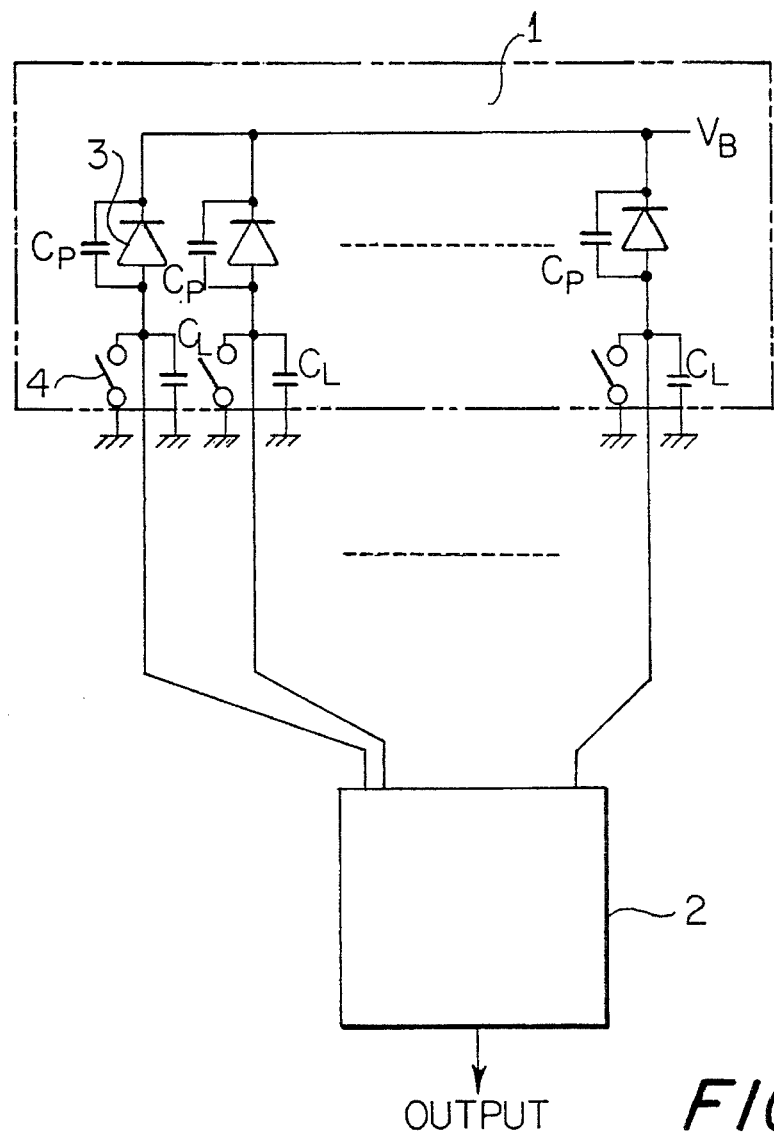
FIG. 2 is a schematic diagram showing an overall arrangement of an image sensor according to the present invention.
Figure 6:
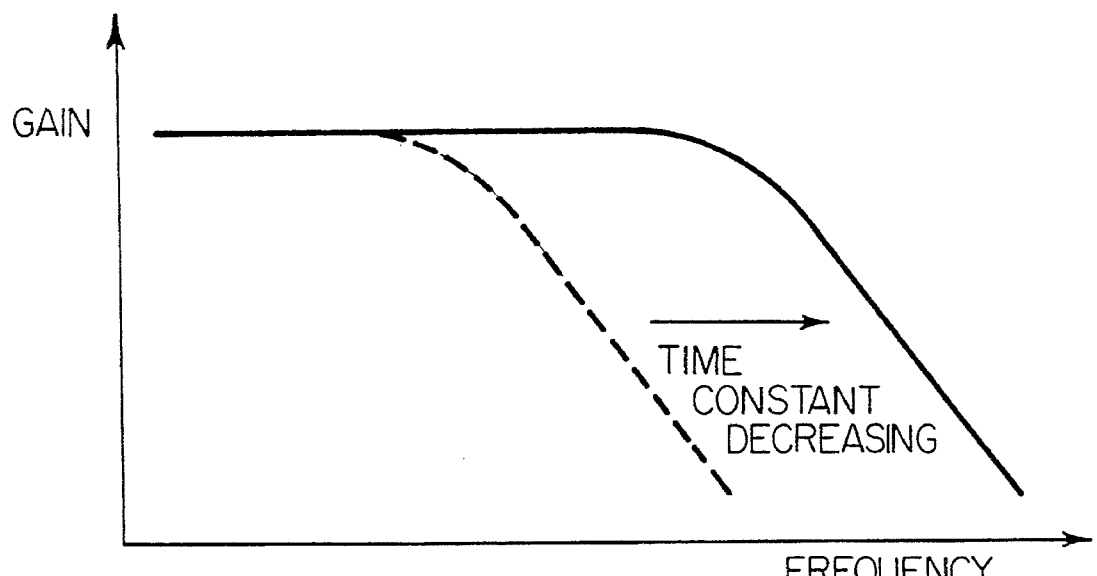
FIG. 6 is a characteristic curve showing frequency characteristics of an amplifier circuit used in a conventional image sensor.
Figure 3:
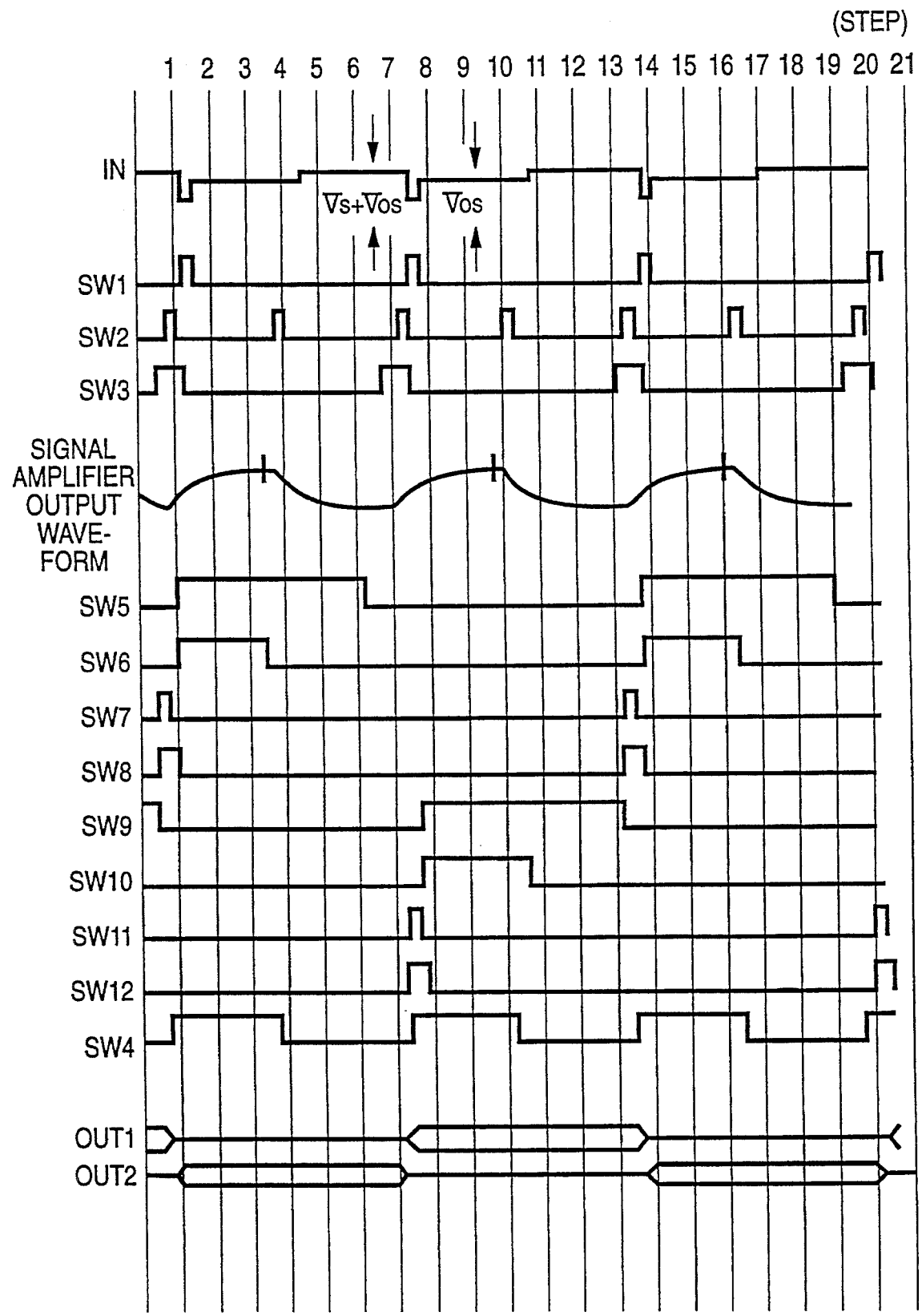
FIG. 3 is a timing chart for explaining the operations of the main parts of an image sensor according to the present invention.
Figure 4:
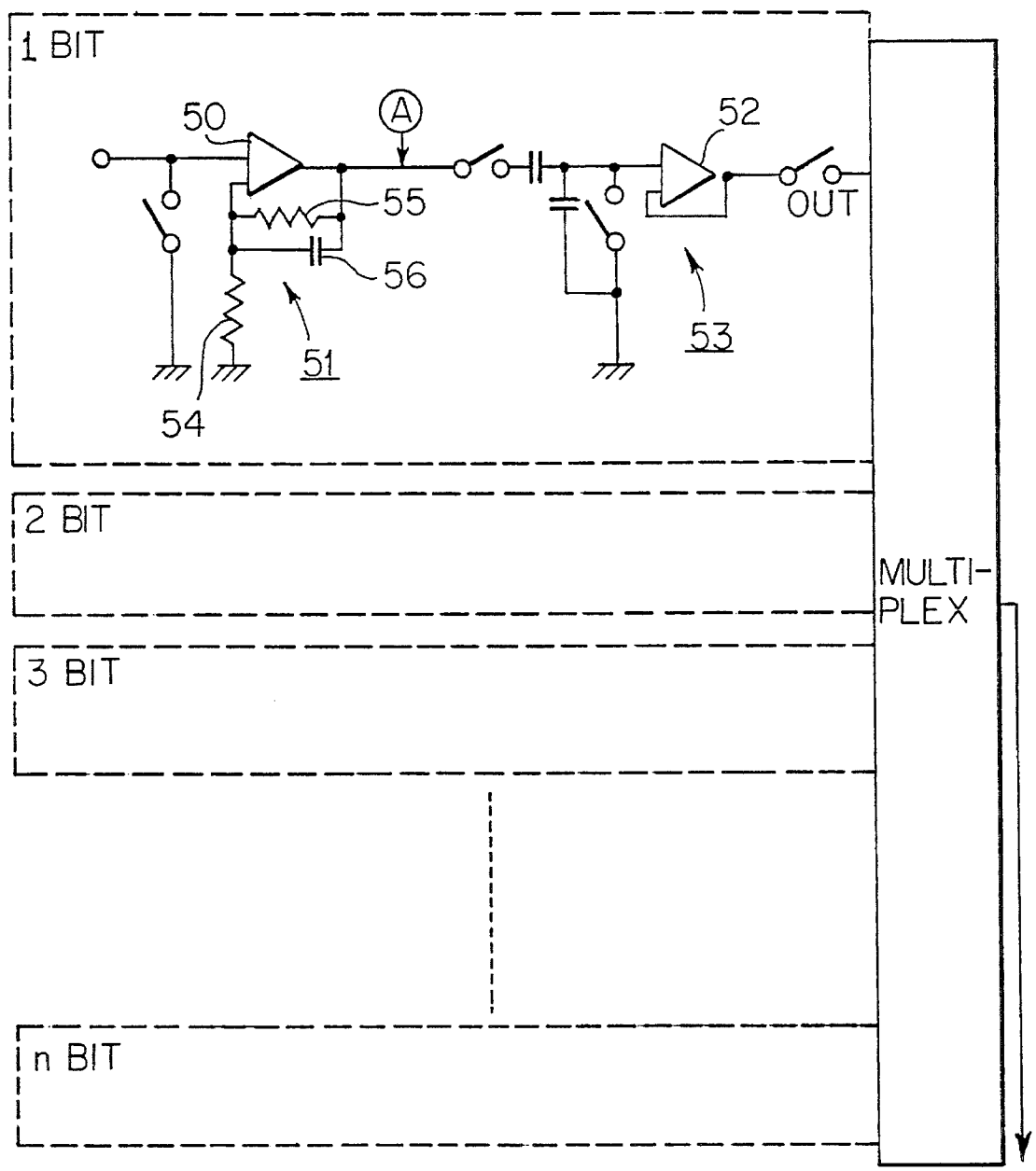
FIG. 4 is a circuit diagram showing an example of the main portion of a conventional image sensor.
Figure 5A:
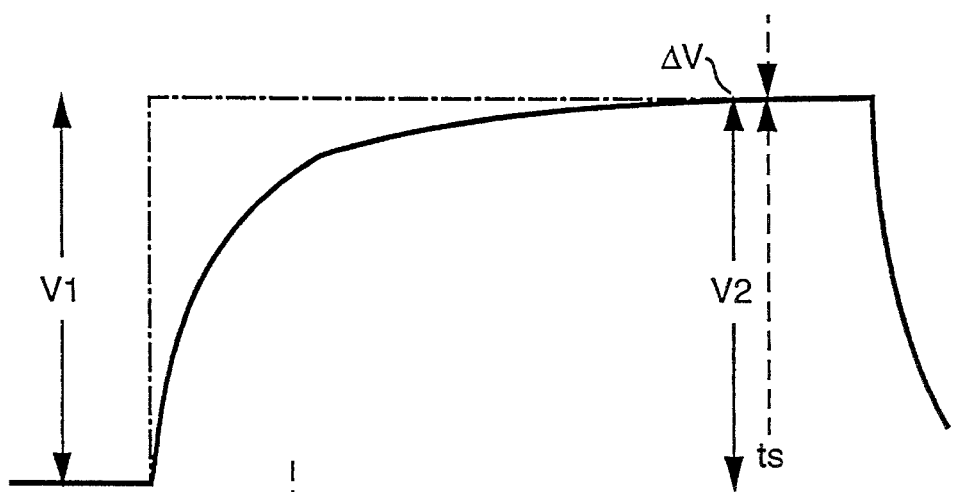
FIGS. 5(a) to 5(c) are waveform chart explanatory of transient response characteristics of an amplifier circuit in a conventional image sensor.
Figure 5B:
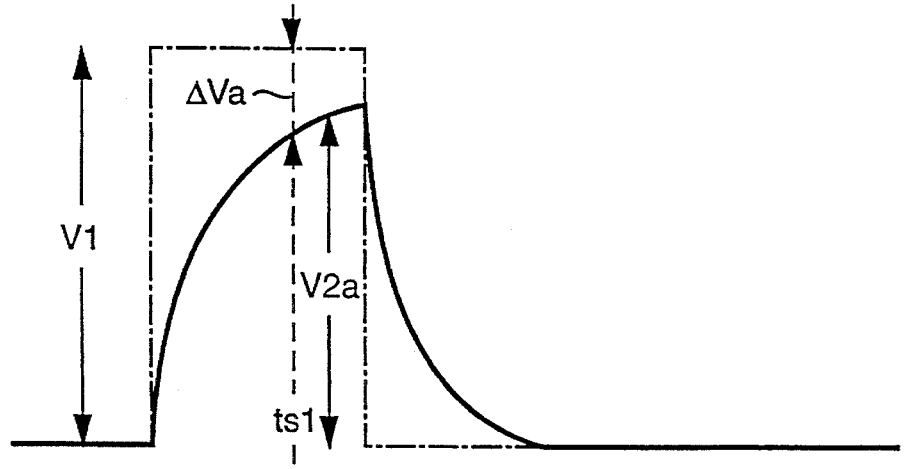
Figure 5C:
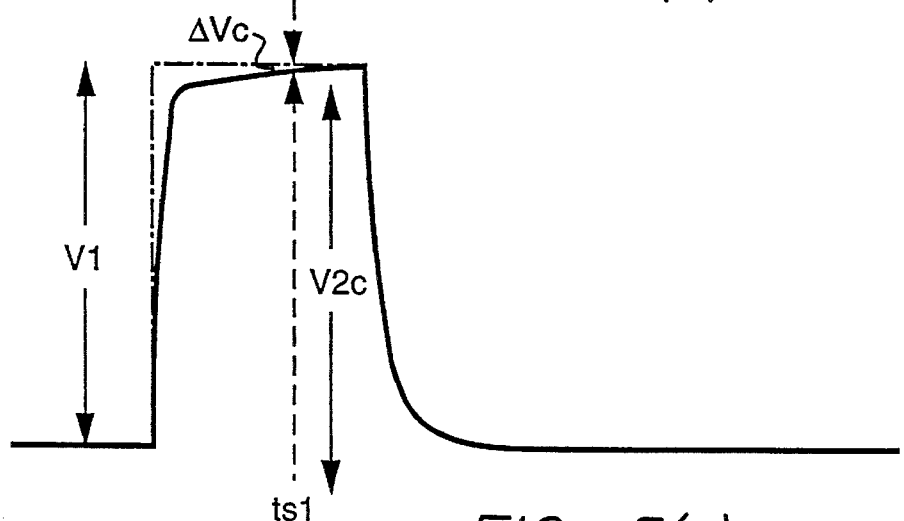

The capacitor $C_p$ depicted in parallel with each photodiode 3 in FIG. 2 is that expediently showing the well-known parasitic capacitance formed within the photodiode 3.

Since the sensor portion 1, as earlier mentioned, is of commonly known structure and its description has been roughly given above, no detailed description will be given.

Description of the signal processor portion 2 as the main portion of the image sensor according to the present embodiment will be given below with reference to FIG. 1.

The signal processor portion 2 is formed of signal processor circuits 5 corresponding, in number, to the photodiodes 3 provided in the sensor portion 1 and a multiplexer 6 as selective outputting means. The signal processor circuit 5 is chiefly made up of an amplifier circuit 8 as amplification means formed with a first operational amplifier 7 in the center, a signal switching circuit 9 as signal switching means, and offset cancel circuits 10a and 10b as two offset eliminating means connected to the signal switching circuit 9 and having the same circuit configuration.

In the amplifier circuit 8 of the present embodiment, a first switching element (briefly denoted by "SW1" in FIG. 3) 12 is connected between the input terminal 11 and ground, while a second switching element (briefly denoted by "SW2" in FIG. 3) 13 and a first capacitor 14 are connected in series and inserted between the input terminal 11 and the noninverting input terminal of the first operational amplifier 7. Further, to the noninverting input terminal of the first operational amplifier 7, one end of a second capacitor 15 and one end of a third switching element (briefly denoted by "SW3" in FIG. 3) 16 are connected. The other end of the third switching element 16 and the other end of the second capacitor 15 are connected together and adapted to be supplied with a bias voltage Vb.

To the inverting input terminal of the first operational amplifier 7 are connected a first, a second, and a third resistor 17, 18, and 19, and one end of a third capacitor 20. The other end of the first resistor 17 is adapted to be supplied with the bias voltage Vb the same as the second capacitor 15. The other ends of the second resistor 18 and the third capacitor 20 are both connected to the output terminal of the first operational amplifier 7. The third resistor 19 is connected to the output terminal of a fourth operational amplifier 21.

Between the output terminal of the first operational amplifier 7 and the input terminal of the fourth operational amplifier 21, there is connected a fourth switching element (briefly denoted by "SW4" in FIG. 3) 22, while a fourth capacitor 23 is connected between the input terminal of the fourth operational amplifier 21 and ground. As suitable elements, for example, for constituting the first to fourth switching elements in the described arrangement of the amplifier circuit 8, MOS transistors can be used.

The amplifier circuit 8 is such that it performs a noninverting amplification function with the amplification factor determined by the ON/OFF state of the fourth switching element 22. More specifically, there is formed a circuit for switching the amplification factor composed of the fourth switching element 22, fourth capacitor 23, fourth operational amplifier 21, and the third resistor 19. When the fourth switching element 22 is rendered conductive, the third resistor 19, connected in series with the fourth operational amplifier 21, comes to be connected in parallel with the second resistor 18, so that the amplification factor of the noninverting amplifier circuit formed with the first operational amplifier 7 in the center falls. The fourth operational amplifier 21 has its amplification factor set to 1 and is arranged to be the so-called voltage follower. The amplification factor when the fourth switching element 22 is conductive and that when it is not conductive is set to differ around 10 times in the present embodiment.

The first and second offset cancel circuits 10a and 10b have basically the same circuit configuration but they have operating periods of time shifted as described later. The first offset cancel circuit 10a has a second operational amplifier 24, while the second offset cancel circuit 10b has a third operational amplifier 25. Between the noninverting input terminal of the second operational amplifier 24 and the output terminal of the first operational amplifier 7 of the amplifier circuit 8, there are inserted a fifth switching element (briefly denoted by "SW5" in FIG. 3) 26 and a fifth and a sixth capacitor 27 and 28 connected in series. Further, between the noninverting input terminal of the third operational amplifier 25 and the output terminal of the first operational amplifier 7, there are inserted a ninth switching element (briefly denoted by "SW9" in FIG. 3) 29 and a seventh and an eighth capacitor 30 and 31 connected in series.

To the junction point of the fifth capacitor 27 and the sixth capacitor 28, one end of a sixth switching element (briefly denoted by "SW6" in FIG. 3) 32 is connected, and to the noninverting input terminal of the second operational amplifier 24, one end of an eighth switching element (briefly denoted by "SW8" in FIG. 3) 33 is connected, while the other ends of the sixth and eighth switching elements 32 and 33 are connected together and adapted to be supplied with the bias voltage Vb.

In the second offset cancel circuit 10b, to the junction point of the seventh capacitor 30 and the eighth capacitor 31, one end of a tenth switching element (briefly denoted by "SW10" in FIG. 3) 34 is connected, and to the noninverting input terminal of the third operational amplifier 25, one end of a twelfth switching element (briefly denoted by "SW12" in FIG. 3) 35 is connected, while the other ends of the tenth and twelfth switching elements 34 and 35 are connected together and adapted to be supplied with the bias voltage Vb.

Further, in the first offset cancel circuit 10a, a seventh switching element (briefly denoted by "SW7" in FIG. 3) 36 is connected between the junction point of the fifth capacitor 27 and the sixth capacitor 28 and the inverting input terminal of the second operational amplifier 24, while, in the second offset cancel circuit 10b, an eleventh switching element (briefly denoted by "SW11" in FIG. 3) 38 is connected between the junction point of the seventh capacitor 30 and the eighth capacitor 31 and the inverting input terminal of the third operational amplifier 25.

Furthermore, in the first offset cancel circuit 10a, a ninth capacitor 39 is inserted between the junction point of the fifth switching element 26 and the fifth capacitor 27 and ground, while, in the second offset cancel circuit 10b, a tenth capacitor 40 is connected between the junction point of the ninth switching element 29 and the seventh capacitor 30 and ground. These ninth and tenth capacitors 39 and 40 are for retaining the signal sampled and input through the fifth switching element 26 or the ninth switching element 29 until the fifth switching element 26 or the ninth switching element 29 became nonconductive.

In the first and second offset cancel circuits 10a and 10b, as suitable elements for the fifth to twelfth switching elements 26, 32, 36, 33, 29, 34, 38, and 35, MOS transistors, for example, can be used.

Operation of the circuit arranged as described above will be described below with reference to the timing chart of FIG. 3. In the following, the first to twelfth switching elements 12, 13, 16, 22, 26, 32, 36, 33, 29, 34, 38, and 35 will be described using the brief denotations (SW1 to SW12) written in FIG. 3.

First, the input terminal 11 is supplied with a voltage Vos+Vs, composed of an offset voltage Vos with a basic image signal voltage Vs superposed thereon, periodically with a predetermined period as shown on the right of the notation "IN" in FIG. 3. This terminal is supplied only with the offset voltage Vos when there is no image signal.

The period with which SW1 periodically becomes conductive (where the pulse signal in the timing chart for SW1 in FIG. 3 is high) is in agreement with the period with which optical charges are read from the photodiodes 3 of the sensor portion 1. While SW1 is conductive, the signal processor circuit 5 is not in a state of reading the input signal, but while SW1 is nonconductive and SW2 is conductive, the signal from the sensor portion 1 is input thereto. SW2 is rendered conductive periodically with a period virtually half the period with which SW1 is rendered conductive.

For convenience, the following description of operation will be made for the steps from step 0 to step 8 in the timing chart of FIG. 3.

When SW2 and SW3 are both rendered conductive (refer to the vicinity of the step 1 in FIG. 3), the voltage composed of the offset voltage Vos with the image signal voltage Vs superposed thereon is applied to one end (the side toward SW2) of the first capacitor 14. Since, at the same time, the other end of the first capacitor 14 is supplied with the bias voltage Vb through SW3, a potential difference Vb−(Vs+Vos) is produced across the first capacitor 14. Since, thereafter, SW2 is rendered nonconductive, the one end of the first capacitor 14 is held in the so-called floating, state.

While SW4 is conductive, the amplification factor of the noninverting amplifier circuit formed with the first operational amplifier 7 in the center is held low as described above. If the amplification factor at this time is assumed to be 10, it follows that the ninth capacitor 39 is charged by and retains the voltage Vb+ 10·Vof1 as the output voltage of the first operational amplifier 7 until SW2 becomes conductive again (the vicinity of the step 4 in FIG. 3), where Vof1 is the offset voltage on the input side of the first operational amplifier 7 and different from the offset voltage Vos included in the input signal to the input terminal 11.

When SW7 and SW8 become conductive (between the step 0 and step 1 in FIG. 3), an offset voltage Vof2 on the input side within the second operational amplifier 24 is applied to the sixth capacitor 28. Hence, the offset voltage Vof2 is prevented from appearing on the output side of the second operational amplifier 24.

Thereafter, when SW2 becomes conductive again (refer to the vicinity of the step 4 in FIG. 3), the offset voltage Vos is applied to the first capacitor 14, whereby the offset voltage Vos in the potential difference across the first capacitor 14, Vb−(Vs+ Vos), is canceled and it is changed to Vb−Vs, and this voltage (Vb−Vs) comes to be applied to the noninverting input terminal of the first operational amplifier 7. Since SW4 is nonconductive at this time (refer to SW4 at the step 4 in FIG. 3), the amplification factor of the noninverting amplifier formed with the first operational amplifier 7 in the center is made larger than when SW4 was conductive. If the amplification factor at this time is assumed to be 100, voltage Vb−100·Vs+10·Vof1 is output to the output terminal of the first operational amplifier 7. This voltage is applied to the ninth capacitor 39 through SW5 so that the ninth capacitor 39 is charged by and retains this voltage.

The voltage charging and retained by the ninth capacitor 39 is applied to the noninverting input terminal of the second operational amplifier 24 through the fifth and sixth capacitors 27 and 28 but, at this time, the voltage component, 10·Vof1, produced by amplification of the offset voltage Vof1 within the first operational amplifier 7 by the first operational amplifier 7 is removed by the fifth capacitor 27, and therefore, a voltage Vb−100·Vs comes to be applied to the noninverting input terminal of the second operational amplifier 24. As a result, the voltage Vb− 100·Vs is output to the output terminal of the second operational amplifier 24 constituting the so-called voltage follower. While the output signal of the second operational amplifier 24 is output through a multiplexer 6, the output timing is set to be the same as the timing (between the step 7 and the step 8 in FIG. 3) at which the operation for the second offset cancel circuit 10b, which is basically the same as the operation done for the first offset cancel circuit 10a, is started (refer to OUT1 between the step 7 and the step 8 in FIG. 3).

Between the steps 7 and 8, at the same time as SW11, SW12, and SW4 are started to be conductive, the operation similar to the above is started for the amplifier circuit 8 and the second offset cancel circuit 10b. During this period of time (from the point between the step 7 and the step 8 to the point between the step 13 and the step 14), the first offset cancel circuit 10a is in the state of outputting its signal through the multiplexer 6 as described above. Namely, the first offset cancel circuit 10a and the second offset cancel circuit 10b alternately perform the operations inputting the image signal and eliminating the offset voltage from the input signal and the operation outputting the image signal free from the offset voltage through the multiplexer 6, and, in addition, the periods of time for performing these operations are mutually shifted by just half the period. Accordingly, while one offset cancel circuit is in the period of eliminating the offset voltage, the other offset cancel circuit is in the state outputting the image signal through the multiplexer 6.

In the present embodiment, a fourth switching element 22 is provided and it is arranged such that the second resistor 18 and the third resistor 19 are put into parallel connection for a predetermined period of time through the switching operation of the fourth switching element 22 and, thereby, the amplification factor of the amplifier circuit 8 is changed. Accordingly, only the necessary signal, i.e., the image signal voltage Vs, is amplified. Thus, the offset voltage Vos included in the input signal is suppressed and a great dynamic range can be obtained from the amplifier circuit 8.

Further, in the present embodiment, there are provided two offset cancel circuits 10a and 10b and a signal switching circuit 9 and it is thereby arranged such that an image signal read from photodiodes 3 periodically with a predetermined period is alternately input to the two offset cancel circuits 10a and 10b by alternate turning on of the fifth switching element 26 and the ninth switching element 29 of the signal switching circuit 9. Hence, the operating period of the first and second offset cancel circuits 10a and 10b can be set virtually double the period with which the image signal is periodically read from the photodiodes 3, and thus the operating speed can be made slower than the speed for reading signal from the photodiodes 3 and the burden on the circuit can accordingly be lessened.

As described above, according to the invention set forth, since the operating speed in the sampling process can be decreased to virtually half the output speed of the signal from the photodiodes, an increase in speed for reading the signal from the photodiodes can be satisfactorily supported.

According to the invention set forth, even when the driving speed of the photodiodes is increased, the operating speed in the two offset cancel means can be reduced to half the driving speed by the provision of signal switching means for making the signal read from the photodiodes to be alternately processed by two offset eliminating means. Accordingly, higher speed operation can easily be supported and, in addition, because the operation speed can be decreased, it is made possible to provide an image sensor capable of being driven at a high speed without producing a deterioration in the S/N ratio, which would follow the high speed driving thereof, and providing a good S/N ratio.

Further, according to the invention set forth in since it is made possible to change the amplification factor only when it is required by the arrangement, making the amplification factor of the amplification means in the invention set forth changeable, deterioration in the S/N ratio by greatly amplifying an unwanted signal can be prevented and a great dynamic range can be secured.

What is claimed is:

1. A method for driving an image sensor comprising the steps of:

periodically reading and amplifying optical charges from photodiodes during a succession of reading periods;

sampling the optical charges read via signal switching means from the photodiodes during a succession of first sampling periods, each being virtually twice as long as each of said reading periods, sampling the optical charges read via said signal switching means from the photodiodes during a succession of second sampling periods, each being virtually twice as long each of said reading periods and out of phase with said first sampling periods; and during said second sampling periods, outputting signals indicative of the optical charges sampled during said first sampling periods respectively occurring immediately before said second sampling periods, and during said first sampling periods, outputting signals indicative of the optical charges sampled during said second sampling periods respectively occurring immediately before said first sampling periods.

2. An image sensor comprising:

amplification means for amplifying optical charge input signals from photodiodes repeatedly with a predetermined period;

two offset cancel means for canceling an offset signal included in an output signal of said amplification means;

signal switching means connected between said amplification means and said two offset cancel means; and selective output means for selectively outputting output signals of said two offset cancel means, wherein said signal switching means has a first sampling portion, which inputs the output signal of said amplification means to one offset cancel means of said two offset cancel means repeatedly with virtually double said period in the reading of optical charges, and a second sampling portion, which inputs the output signal of said amplification means to the other offset cancel means of said two offset cancel means repeatedly with virtually double said period in the reading of optical charges, said first sampling portion and said second sampling portion alternately performing said sampling operations at periods of time shifted half the period from each other, and wherein said selective output means, while said first sampling portion is performing its sampling operation, selectively outputs the output signal of said second sampling portion and, while said second sampling portion is performing its sampling operation, selectively outputs the output signal of said first sampling portion.

3. An image sensor according to claim 2, wherein said amplification means includes amplification factor adjustment means for periodically changing the amplification factor of said amplification means.

4. An image sensor according to claim 3, wherein said amplification factor adjustment means, during the period of time when the optical charge signal from the photodiodes is input to said amplification means, makes the amplification factor of said amplification means greater than that in the period of time preceding or subsequent to the optical charge signal inputting.

5. An image sensor according to claim 3 or 4, wherein said amplification adjustment means connects a resistor in parallel to a feedback resistor of an amplifier circuit constituting said amplification means repeatedly with a predetermined period.

\* \* \* \* \*

UNITED STATES PATENT AND TRADEMARK OFFICE
CERTIFICATE OF CORRECTION

PATENT NO. : 5,485,206
DATED : January 16, 1996
INVENTOR(S) : Eigo NAKAGAWA et al.

It is certified that error appears in the above-indentified patent and that said Letters Patent is hereby corrected as shown below:

Claim 2, column 10, line 32, after "performing", delete "said".

Signed and Sealed this

Twenty-sixth Day of November 1996

Attest:

BRUCE LEHMAN

Attesting Officer    Commissioner of Patents and Trademarks